(12) United States Patent
Vanstone et al.

(10) Patent No.: US 7,243,232 B2
(45) Date of Patent: *Jul. 10, 2007

(54) KEY AGREEMENT AND TRANSPORT PROTOCOL

(75) Inventors: Scott A. Vanstone, Campbellville (CA);
Alfred J. Menezes, Toronto (CA);
Minghua Qu, Mississauga (CA); Rene Struik, Toronto (CA)

(73) Assignee: Certicom Corp., Mississauga (CA)

( * ) Notice: Subject to any disclaimer, the term of this patent is extended or adjusted under 35 U.S.C. 154(b) by 840 days.

This patent is subject to a terminal disclaimer.

(21) Appl. No.: 10/092,972

(22) Filed: Mar. 8, 2002
(Under 37 CFR 1.47)

(65) Prior Publication Data

US 2003/0044019 A1   Mar. 6, 2003

Related U.S. Application Data

(63) Continuation-in-part of application No. 08/426,090, filed on Apr. 21, 1995, now Pat. No. 6,487,661.

(51) Int. Cl.
*H04L 9/00* (2006.01)

(52) U.S. Cl. ............... 713/171; 713/168; 713/169; 713/170; 713/172; 380/285; 380/278; 380/30

(58) Field of Classification Search ........ 713/168–172; 380/278, 285, 30
See application file for complete search history.

(56) References Cited

U.S. PATENT DOCUMENTS

| | | | |
|---|---|---|---|
| 4,200,770 A | 4/1980 | Hellman et al. | |
| 4,956,863 A | 9/1990 | Goss | |
| 5,586,186 A | 12/1996 | Yuval et al. | |
| 5,600,725 A | 2/1997 | Rueppel et al. | |
| 5,761,305 A | 6/1998 | Vanstone et al. | |
| 5,889,865 A | 3/1999 | Vanstone et al. | |
| 5,896,455 A | 4/1999 | Vanstone et al. | |
| 6,122,736 A | 9/2000 | Vanstone et al. | |

FOREIGN PATENT DOCUMENTS

DE    3915262 A1    11/1989

(Continued)

OTHER PUBLICATIONS

Boyd, Colin and Mao, Wenbo, "Design and Analysis of Key Exchange Protocols via Secure Channel Identification", Advances in Cryptology—ASIACRYPT '94, 4th International Conference on the Theory and Applications of Cryptology, Proceedings, Nov. 28, 1994, pp. 171-181, Springer, Wollongong. Australia.

(Continued)

*Primary Examiner*—Hosuk Song
(74) *Attorney, Agent, or Firm*—John R. S. Orange; Brett J. Slaney; Blake, Cassels + Graydon

(57) ABSTRACT

A key establishment protocol includes the generation of a value of cryptographic function, typically a hash, of a session key and public information. This value is transferred between correspondents together with the information necessary to generate the session key. Provided the session key has not been compromised, the value of the cryptographic function will be the same at each of the correspondents. The value of the cryptographic function cannot be compromised or modified without access to the session key.

19 Claims, 7 Drawing Sheets

FOREIGN PATENT DOCUMENTS

| | | |
|---|---|---|
| EP | 0393806 A2 | 10/1990 |
| EP | 0639907 A1 | 2/1995 |
| EP | 0661844 A2 | 7/1995 |
| EP | 0739106 A1 | 10/1996 |
| EP | 0977396 A2 | 2/2000 |
| EP | 1282260 A1 | 2/2003 |
| WO | 99/57844 A1 | 11/1999 |

OTHER PUBLICATIONS

Diffie, Whitfield et al., "Authentication and Authenticated Key Exchanges," Designs, Codes and Cryptography, Jun. 1992, pp. 107-125, vol. 2, No. 32, Kluwer Academic Publishers, the Netherlands.

Matsumoto, "On Seeking Smart Public-Key-Distribution Systems", Transactions of the IECE of Japan, Feb. 1986, pp. 99-106, vol. E69, No. 2.

Horster, "Meta-ElGamal Signature Schemes", 1994 2nd Association of Computing Machinery Computer and Communications Security Conference, May 31, 1994, pp. 96-107, ACM Press, Fairfax.

Horster, "Meta-Message Recovery and and Meta-Blind signature schemes based on the discrete logarithm problem and their applications", Advances in Cryptology, ASIACRYPT '94 (LNCS 917), pp. 224-237, Springer Verlag.

Krawczyk, H.; "Skeme: A Versatile Secure Key Exchange Mechanism for Internet"; Proceedings of the Symposium on San Diego, CA, U.S.A.; Feb. 22-23, 1996; IEEE Computer Society; U.S.A.

Menezes, Oorschot, Vanstone; Handbook of Applied Cryptography; 1997; pp. 402, 499; CRC Press LLC; Boca Raton, Florida, U.S.A.

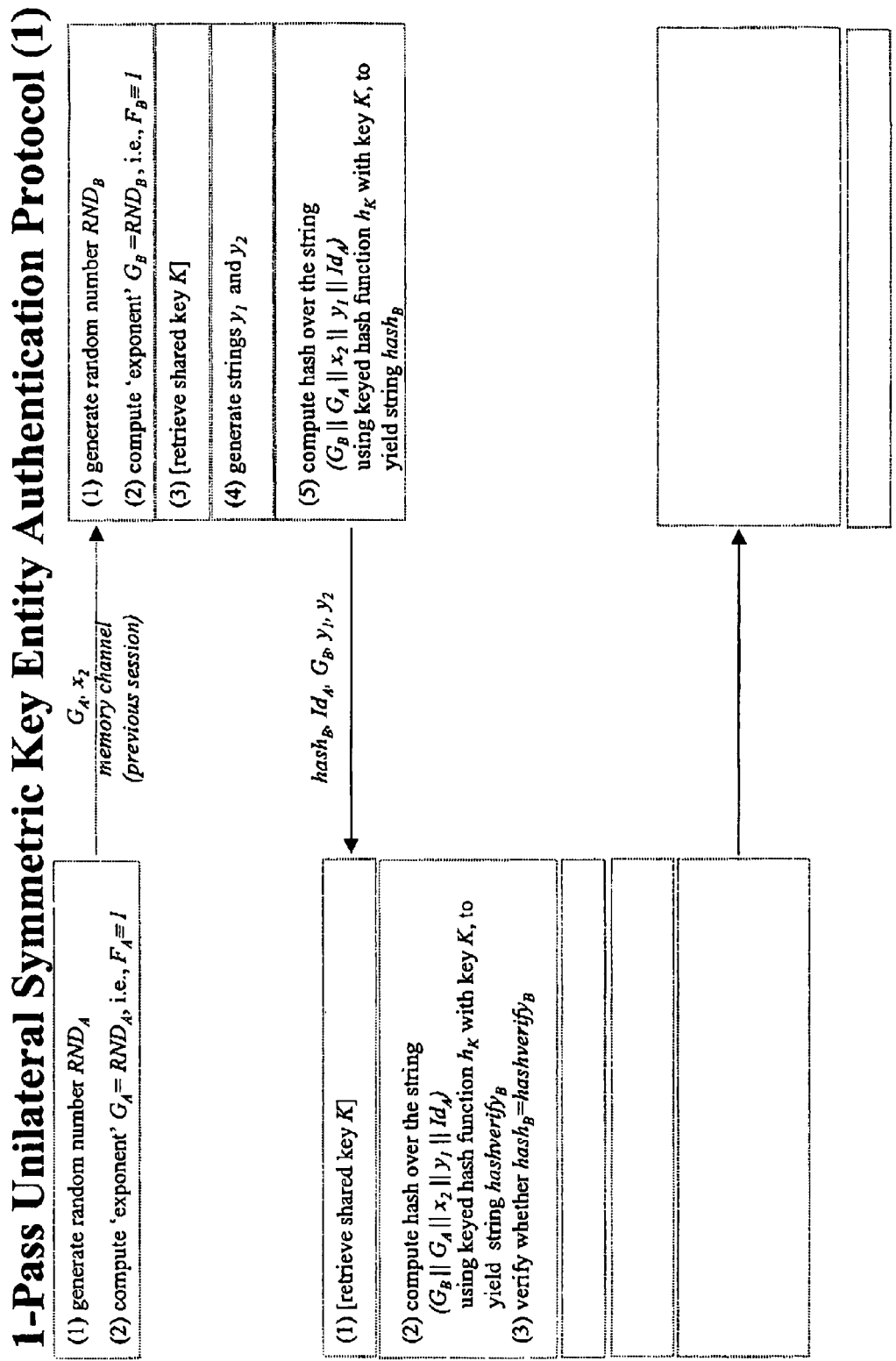

KEY AGREEMENT AND TRANSPORT PROTOCOL

This application is a continuation-in-part application of U.S. patent application Ser. No. 08/426,090 filed as Apr. 21, 1995 now U.S. Pat. No. 6,487,661.

The present invention relates to key agreement protocols for transfer and authentication of encryption keys.

To retain privacy during the exchange of information it is well known to encrypt data using a key. The key must be chosen so that the correspondents are able to encrypt and decrypt messages but such that an interceptor cannot determine the contents of the message.

In a secret key cryptographic protocol, the correspondents share a common key that is secret to them. This requires the key to be agreed upon between the correspondents and for provision to be made to maintain the secrecy of the key and provide for change of the key should the underlying security be compromised.

Public key cryptographic protocols were first proposed in 1976 by is Diffie-Hellman and utilized a public key made available to all potential correspondents and a private key known only to the intended recipient. The public and private keys are related such that a message encrypted with the public key of a recipient can be readily decrypted with the private key but the private key cannot be derived from the knowledge of the plaintext, ciphertext and public key.

Key establishment is the process by which two (or more) parties establish a shared secret key, called the session key. The session key is subsequently used to achieve some cryptographic goal, such as privacy. There are two kinds of key agreement protocol; key transport protocols in which a key is created by one party and securely transmitted to the second party; and key agreement protocols, in which both parties contribute information which jointly establish the shared secret key. The number of message exchanges required between the parties is called the number of passes. A key establishment protocol is said to provide implicit key authentication (or simply key authentication) if one party is assured that no other party aside from a specially identified second party may learn the value of the session key. The property of implicit key authentication does not necessarily mean that the second party actually possesses the session key. A key establishment protocol is said to provide key confirmation if one party is assured that a specially identified second party actually has possession of a particular session key. If the authentication is provided to both parties involved in the protocol, then the key authentication is said to be mutual if provided to only one party, the authentication is said to be unilateral.

There are various prior proposals which claim to provide implicit key authentication.

Examples include the Nyberg-Rueppel one-pass protocol and the Matsumoto-Takashima-Imai (MTI) and the Goss and Yacobi two-pass protocols for key agreement.

The prior proposals ensure that transmissions between correspondents to establish a common key are secure and that an interloper cannot retrieve the session key and decrypt the ciphertext. In this way security for sensitive transactions such as transfer of funds is provided.

For example, the MTI/AO key agreement protocol establishes a shared secret K, known to the two correspondents, in the following manner:

1. During initial, one-time setup, key generation and publication is undertaken by selecting and publishing an appropriate system prime p and generator in a manner guaranteeing authenticity. Correspondent A selects as a long-term private key a random integer "a", $1 \leq a \leq p-2$, and computes a long-term public key $z_A = \alpha^a$ mod p. B generates analogous keys b, $z_B$. A and B have access to authenticated copies of each other's long-term public key.

2. The protocol requires the exchange of the following messages.

$$A \to B: \alpha^x \bmod p \quad (1)$$

$$A \to B: \alpha^y \bmod p \quad (2)$$

The values of x and y remain secure during such transmissions as it is impractical to determine the exponent even when the value of a and the exponentiation is known provided of course that p is chosen sufficiently large.

3. To implement the protocol the following steps are performed each time a shared key is required.

(a) A chooses a random integer $x, 1 \leq x \leq p-2$, and sends B message (1) i.e. $\alpha^x$ mod p.

(b) B chooses a random integer $y, 1 \leq y \leq p-2$, and sends A message (2) i.e. $\alpha^y$ mod p.

(c) A computes the key $K = (\alpha^y)^a z_B^x$ mod p.

(d) B computes the key $K = (\alpha^x)^b z_A^y$ mod p.

(e) Both share the key $K - \alpha^{bx+ay}$.

In order to compute the key K, A must use his secret key a and the random integer x, both of which are known only to him. Similarly B must use her secret key b and random integer y to compute the session key L Provided the secret keys a,b remain uncompromised, an interloper cannot generate a session key identical to the other correspondent. Accordingly, any ciphertext will not be decipherable by both correspondents.

As such this and related protocols have been considered satisfactory for key establishment and resistant to conventional eavesdropping or man-in-the-middle attacks.

In some circumstances it may be advantageous for an adversary to mislead one correspondent as to the true identity of the other correspondent.

In such an attack an active adversary or interloper E modifies messages exchanged between A and B, with the result that B believes that he shares a key K with E while A believes that she shares the same key K with B. Even though E does not learn the value of K the misinformation as to the identity of the correspondents may be useful.

A practical scenario where such an attack may be launched successfully is the following. Suppose that B is a bank branch and A is an account holder. Certificates are issued by the bank headquarters and within the certificate is the account information of the holder. Suppose that the protocol for electronic deposit of funds is to exchange a key with a bank branch via a mutually authenticated key agreement. Once B has authenticated the transmitting entity, encrypted funds are deposited to the account number in the certificate. If no further authentication is done in the encrypted deposit message (which might be the case to save bandwidth) then the deposit will be made to E's account.

It is therefore an object of the present invention to provide a protocol in which the above disadvantages are obviated or mitigated.

According therefore to the present invention there is provided a method of authenticating a pair of correspondents A,B to permit exchange of information therebetween, each of said correspondents having a respective private key a,b and a public key $p_A, p_B$ derived from a generator $\alpha$ and respective ones of said private keys a,b, said method including the steps of i) a first of said correspondents A selecting a first random integer x and exponentiating a function f(α) including said generator to a power g(x) to provide a first exponentiated function $f(\alpha)^{g(x)}$;

ii) said first correspondent A forwarding to a second correspondent B a message including said first exponentiated function $f(\alpha)^{g(x)}$;

iii) said correspondent B selecting a second random integer y and exponentiating a function f(α) including said generator to a power g(y) to provide a second exponentiated function $f(\alpha)^{g(y)}$;

iv) said second correspondent B constructing a session key K from information made public by said first correspondent A and information that is private to said second correspondent B, said session key also being constructible by said first correspondent A from information made public by B and information that is private to said first correspondent A;

v) said second correspondent B generating a value h of a function F[δ,K] where F[δ,K] denotes a cryptographic function applied conjointly to δ and K and where δ is a subset of the public information provided by B thereby to bind the values of δ and K;

vi) said second correspondent B forwarding a message to said first correspondent A including said second exponential function $f(\alpha)^{g(y)}$ and said value h of said cryptographic function F[δ,K];

vii) said first correspondent receiving said message and computing a session key K' from information made public by said second correspondent B and private to said first correspondent A;

viii) said first correspondent A computing a value h' of a cryptographic function h,h'F[δ,K']; and ix) comparing said values obtained from said cryptographic functions F to confirm their correspondence.

As the session key K can only be generated using information that is private to either A or B, the binding of K with δ with the cryptographic function h prevents E from extracting K or interjecting a new value function that will correspond to that obtained by A.

Embodiments of the invention will now be described by way of example only with reference to the accompanying drawings in which.

FIGS. 2 through 7 are schematic representations of implementations of different protocols.

Figure 1:
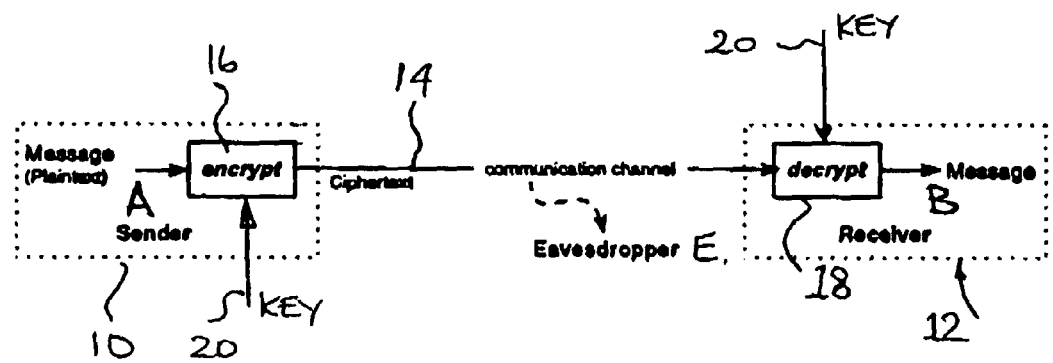
FIG. 1 is a schematic representation of a data communication system.

Referring therefore to FIG. 1, a pair of correspondents, 10,12, denoted as correspondent A and correspondent B, exchange information over a communication channel 14. A cryptographic unit 16,18 is interposed between each of the correspondents 10,12 and the channel 14. A key 20 is associated with each of the cryptographic units 16,18 to convert plaintext carried between each unit 16,18 and its respective correspondent 10,12 into ciphertext carried on the channel 14.

In operation, a message generated by correspondent A, 10, is encrypted by the unit 16 with the key 20 and transmitted as ciphertext over channel 14 to the unit 18.

The key 20 operates upon the ciphertext in the unit 18 to generate a plaintext message for the correspondent B, 12. Provided the keys 20 correspond, the message received by the correspondent 12 will be that sent by the correspondent 10.

In order for the system shown in FIG. 1 to operate it is necessary for the keys 20 to be identical and therefore a key agreement protocol is established that allows the transfer of information in a public manner to establish the identical keys. A number of protocols are available for such key generation and embodiments of the present invention will be described below in the context of modifications of existing protocols.

A commonly used set of protocols are collectively known as the Matsumoto-Takashima-Imai or "MTI" key agreement protocols, and are variants of the Diffie-Hellman key exchange. Their purpose is for parties A and B to establish a secret session key K.

The system parameters for these protocols are a prime number p and a generator a of the multiplicative group Correspondent A has private key a and public key $p_A=\alpha^a$. Correspondent B has private key b and public key $p_B=\alpha^b$. In all four protocols exemplified below, $text_A$ refers to a string of information that identifies party A. If the other correspondent B possesses an authentic copy of correspondent A's public key, then $text_A$ will contain A's public-key certificate, issued by a trusted center; correspondent B can use his authentic copy of the trusted center's public key to verify correspondent A's certificate, hence obtaining an authentic copy of correspondent A's public key.

In each example below it is assumed that an interloper E wishes to have messages from A identified as having originated from E herself To accomplish this, E selects a random integer e, $1 \leq e \leq p-2$, computes $p_E=(p_A)^{e=\alpha ae}$ mod p, and gets this certified as her public key. E does not know the exponent ae, although she knows e. By substituting $text_E$ for $text_A$, the correspondent B will assume that the message originates from E rather than A and use E's public key to generate the session key K. E also intercepts the message from B and uses his secret random integer e to modify its contents. A will then use that information to generate the same session key allowing A to communicate with B.

The present invention is exemplified by modifications to 4 of the family of MTI protocols which foil this new attack thereby achieving the desired property of mutual implicit authentication. In the modified protocols exemplified below F(X,Y) denotes a cryptographic function applied to a string derived from x and y. Typically and as exemplified a hash function, such as the NIST "Secure Hash Algorithm" (SHA-1), is applied to the string obtained by concatenating X and Y but it will be understood that other cryptographic functions may be used.

EXAMPLE 1

MTI/A0 Protocol

The existing protocol operates as follows:

1. Correspondent A generates a random integer x, $1 \leq x \leq p-2$, computes $\alpha^x$, and sends $\{\alpha^x, text_A\}$ to party B.

2. Correspondent B generates a random integer y, $1 \leq y \leq p-2$, computes $\alpha^y$, and sends $\{\alpha^y, text_B\}$ to party A.

3. Correspondent A computes $K=(\alpha^y)^a(p_B)^x=\alpha^{ay+bx}$.

4. Correspondent B computes $K=(a^x)^b(p_A)^y=\alpha^{ay+bx}$.

A common key K is thus obtained. However, with this arrangement, interloper E may have messages generated by correspondent A identified as having originated from E in the following manner.

1. E intercepts A's message $\{\alpha^x, text_A\}$ and replaces it with $\{\alpha^x, text_E\}$. The provision of the message $text_E$ identifies the message as having originated at E.

2. B sends $\{\alpha^y, \text{text}_B\}$ to E, who then forwards $\{(\alpha^y)^e, \text{text}_B\}$ to A. Since A receives $\text{text}_B$, he assumes the message originates at B and, as he does not know the value of y, assumes that $\alpha^{ye}$ is valid information.
3. A computes $K=(\alpha^{ey})^a(p_B)^x=\alpha^{aey+bx}$.
4. B computes $K=(\alpha^x)^b(p_E)^y=\alpha^{aey+bx}$.
5. A and B now share the key K, even though B believes he shares a key with E.

Accordingly any further transactions from A to B will be considered by B to have originated at E. B will act accordingly crediting instruction to E. Even though the interloper E does not learn the value of the session key K nevertheless the assumption that the message originates at E may be valuable and achieve the desired effect.

To avoid this problem, the protocol is modified as follows:
1. A generates a random integer $x, 1 \leq x \leq p-2$, computes $\alpha^x$, and sends $\{\alpha^x, \text{text}_A\}$ to party B.
2. B generates a random integer $y, 1 \leq y \leq p-2$, and computes $\alpha^y$, $K=(\alpha^x)^b(p_A)^y=\alpha^{ay+bx}$, and a value h of cryptographic hash function $F(\alpha^y, \alpha^{ay+bx})$ which is a function of public information $\delta$ and the key K. B sends $\{\alpha^y h, \text{text}_B\}$ to party A.
3. A computes $K=(\alpha^y)^a(p_B)^x=\alpha^{ay+bx}$. A also computes a value h' of cryptographic hash function $F(\alpha^y, K)$ and verifies that this value is equal to h.

If E attempts to interpose her identification, $\text{text}_E$, the attack fails on the modified protocols because in each case B sends the hash value $F(\delta, K)$, where $\delta$ is B's random exponential, $\alpha^y$, thereby binding together the values of $\delta$ and K. E cannot subsequently replace the value of $\delta$ with $\delta^e$ and compute $F(\delta^e, K)$ since E does not know K. Even though E knows $\alpha^y$, this is not sufficient to extract K from the hash value h. Accordingly, even if E interposes the value $\alpha^{ye}$ so that the keys 20 will agree, the values h,h' will not.

EXAMPLE 2

MTI/B0 Protocol

In this protocol,
1. A generates a random integer $x, 1 \leq x \leq p-2$, computes $(p_B)^x=\alpha^{bx}$, and sends $\{\alpha^{bx}, \text{text}_A\}$ to party B.
2. B generates a random integer $y, 1 \leq y \leq p-2$, computes $(p_A)^y=\alpha^{ay}$, and sends $\{\alpha^{ay}, \text{text}_B\}$ to party A.
3. A computes $K=(\alpha^{ay})^{a^{-1}}\alpha^x=\alpha^{x+y}$
4. B computes $K=(\alpha^{bx})^{b^{-1}}\alpha^y=\alpha^{x+y}$ This protocol is vulnerable to the interloper E if,
1. E replaces A's message $\{a^{bx}, \text{text}_A\}$ with $\{\alpha^{bx}, \text{text}_E\}$ to identify herself as the originator to the message.
2. B sends $\{(p_E)^y, \text{text}_B\}$ to E, who then computes $((P_E)^y)^{e^{-1}}=\alpha^{ay}$ and forwards $\{\alpha^{ay}, \text{text}_B\}$ to A.
3. A computes $K=(\alpha^{ay})^{a^{-1}}\alpha^x=\alpha^{x+y}$
4. B computes $K=(\alpha^{bx})^{b^{-1}}\alpha^y=\alpha^{x+y}$
5. A and B now share the key K, even though B believes he shares a key with E.

This protocol may be modified to resist E's attack as follows.
1. A generates a random integer $x, 1 \leq x \leq p-2$, computes $(p_B)^x=\alpha^{bx}$, and sends $\{\alpha^{bx}, \text{text}_A\}$ to party B.
2. B generates a random integer $y, 1 \leq y \leq p-2$, and computes $(p_A)^y=\alpha^{ay}$, $K=(\alpha^{bx})\alpha^y=\alpha^{x+y}$, and the value h of hash function $F(\alpha^y=\alpha^{x+y})$. B sends $\{\alpha^y h, \text{text}_B\}$ to A.
3. A computes $K=(\alpha^{ay})\alpha^x=\alpha^{x+y}$. A also computes the value h' of hash function $F(\alpha^y, K)$ and verifies that this value is equal to h.

Once again, E cannot determine the session key K and so cannot generate a new value of the hash function to maintain the deception.

EXAMPLE 3

MTI/C0 Protocol

This protocol operates as follows:
1. A generates a random integer $x, 1 \leq x \leq p-2$, computes $(p^B)^x=\alpha^{bx}$ and sends $\{(\alpha^{bx}, \text{text}_A\}$ to party B.
2. B generates a random integer $y, 1 \leq y \leq p-2$, computes $(p_A)^y=\alpha^{ay}$, and sends $\{\alpha^{ay}, \text{text}_B\}$ to party A.
3. A computes $K=(\alpha^{ay})^{a^{-1}x}=\alpha^{xy}$
4. B computes $K=(\alpha^{bx})^{b^{-1}y}=\alpha^{xy}$ The interloper E may interpose her identity as follows:
1. E replaces A's message $\{a^{bx}, \text{text}_A\}$ with $\{\alpha^{bx}, \text{text}_E\}$.
2. B sends $\{(p_E)^y, \text{text}_B\}$ to E, who then computes $((p_E)^y)^{e-1}=\alpha^{ay}$ and forwards $\{\alpha^{ay}, \text{text}_B\}$ to A.
3. A computes $K=(\alpha^{ay})^{a^{-1}x}=\alpha^{xy}$
4. B computes $K=(\alpha^{bx})^{b^{-1}y}=\alpha^{xy}$
5. A and B now share the key K, even though B believes he shares a key with E.

To avoid this attack protocol is modified as follows:
1. A generates a random integer $x, 1 \leq x \leq p-2$, computes $(p_B)^x=\alpha^{bx}$, and sends $\{\alpha^{bx}, \text{text}_A\}$ to party B.
2. B generates a random integer $y, 1 \leq y \leq p-2$, and computes $(p_A)^y=\alpha^{ay}$, $K=(\alpha^{bx})^{b^{-1}y}=\alpha^{xy}$, and value h of hash function $F(\alpha^{ay}, \alpha^{xy})$. B sends $\{\alpha^{ay} h, \text{text}_B\}$ to party A.
3. A computes $K=(\alpha^{ay})^{a^{-1}x}=\alpha^{xy}$. A also computes the value h' of $F(\alpha^{ay}, K)$ and verifies that this value is equal to h.

EXAMPLE 4

MTI/C1 Protocol

In this protocol:
1. A generates a random integer $x, 1 \leq x \leq p-2$, computes $(p_B)^{ax}=\alpha_{abx}$, and sends $\{\alpha^{abx}, \text{text}_A\}$ to party B.
2. B generates a random integer $y, 1 \leq y \leq p-2$, computes $(p_A)^{by}=\alpha^{aby}$, and sends $\{\alpha^{aby}, \text{text}_B\}$ to party A.
3. A computes $K=(\alpha^{aby})^x=\alpha^{abxy}$.
4. B computes $K=(\alpha^{abx})^y=\alpha^{abxy}$.

E can act as an interloper as follows:
1. E replaces A's message $\{\alpha^{abx}, \text{text}_A\}$ with $\{\alpha^{abx}, \text{text}_E\}$.
2. B sends $\{(p_E)^{by}, \text{text}_B\}$ to E, who then computes $((p_E)^{by})^{e-1}=\alpha^{aby}$ and forwards $\{\alpha^{aby}, \text{text}_B\}$ to A.
3. A computes $K=(\alpha^{aby})^x=\alpha^{abxy}$.
4. B computes $K=(\alpha^{abx})^y=\alpha^{abxy}$.
5. A and B now share the key K, even though B believes he shares a key with E.

To avoid this, the protocol is modified as follows:
1. A generates a random integer $x, 1 \leq x \leq p-2$, computes $(p_B)^{ax}=\alpha^{abx}$, and sends $\{\alpha^{abx}, \text{text}_A\}$ to party B.
2. B generates a random integer $y, 1 \leq y \leq p-2$, and computes $(p_A)^{by}=\alpha^{aby}$, $K=(\alpha^{abx})^y=\alpha^{abxy}$, and $h=F(\alpha^{aby}, \alpha^{abxy})$. B sends $\{\alpha^{aby}, h, \text{text}_B\}$ to party A.
3. A computes $K=(\alpha^{aby})^x=\alpha^{abxy}$. A also computes $h'=F(\alpha^{aby}, K)$ and verifies that this value is equal to h.

In each of the modified protocols discussed above, key confirmation from B to A is provided.

As noted above instead of F being a cryptographic hash function other functions could be used. For example, an option available is to choose $F=\epsilon_K$, where $\epsilon$ is the encryption function of a suitable symmetric-key encryption scheme, and K is the session key established. Because E cannot generate the session key K, it is similarly not able to generate the value of the function F and therefore cannot interpose for the correspondent A.

The technique described above can be applied to other similar key exchange protocols, including all of the 3 infinite classes of MTI protocols called MTI-A(k), MTI-B(k) and MTI-C(k).

The Goss authenticated key exchange protocol is similar to the MTI/A0 protocol, except that the session key is the bitwise exclusive-OR of $\alpha^{ay}$ and $\alpha^{bx}$; that is $K=\alpha^{ay} \oplus \alpha^{bx}$ instead of being the product of $\alpha^{ay}$ and $\alpha^{bx}$. Hence the attack on the MTI/A0 protocol and its modification can be extended in a straightforward manner to the case of the Goss protocol.

Similarly Yacobi's authenticated key exchange protocol is exactly the same as the MTI/A0 protocol, except that a is an element of the group of units, where n is the product of 2 large primes. Again, the attack on the MTI/A0 protocol and its modification can be extended in a straightforward manner to the case of the Goss protocol.

A further way of foiling the interposition of E is to require that each entity prove to a trusted center that it knows the exponent of $\alpha$ that produces its public key P, before the center issues a certificate for the public key. Because E only knows "e" and not "ae" it would not meet this requirement. This can be achieved through zero knowledge techniques to protect the secrecy of the private keys but also requires the availability of a trusted centre which may not be convenient.

Each of the above examples has been described with a 2 pass protocol for key authentication. One pass protocols also exist to establish a key between correspondents and may be similarly vulnerable.

As an example the Nyberg-Rueppel one pass key agreement protocol will be described and a modification proposed.

The purpose of this protocol is for party A and party B to agree upon a secret session key K.

The system parameters for these protocols are a prime number p and a generator $\alpha$ of the multiplicative group $\alpha \epsilon Z^*_p$. User A has private key a and public key $p_A = \alpha^a$. User B has private key b and public key $p_B = \alpha^b$.

1. A selects random integers x and t, $1 \leq x, t \leq p-2$.
2. B recovers the value $\alpha^x$ mod p by computing $\alpha^s (p_A)_r$ mod p and then computes the shared session key $K=(r\alpha^x)^{b^{-1}}=\alpha^t$ mod p.

If interloper E wishes to have messages from A identified as having originated from herself, E selects a random integer e, $1 \leq e \leq p-2$, computes $p_E = \alpha^e$, and gets this certified as her public key.

1. E intercepts A's message $\{r,s,\text{text}_A\}$ and computes $\alpha^x = \alpha^s(p_A)^r$ and $\alpha^{bt} = r\alpha^x$.
2. E then selects a random integer x', $1 \leq x' \leq p-2$, computes $r'=\alpha_{b,t}\alpha^{-x'}$mod p and $s'=x'-r'e$ mod (p-1).
3. E sends $\{r',s',\text{text}_E\}$ to B.
4. B recovers the value mod p by computing $\alpha\delta'(p_E)^{r'}$ mod p and then computes $K=(r'\alpha^{x'})^{b^{-1}}=\alpha^1$ mod p.
5. A and B now share the key K, even though B believes he shares a key with E.

To foil such an attack the protocol is modified by requiring A to also transmit a value h of $F(p_A,K)$, where F is a hash function, an encryption function of a symmetric-key system with key K or other suitable cryptographic function. The modified protocol is the following.

1. A selects random integers x and t, $1 \leq x, t \leq p-2$.
2. A computes $r=(p_B)^t\alpha^{-x}$, mod p, $s=x-ra$ mod (p-1), session key $K=\alpha^1$ mod p and the value h of hash function $F(p_A,K)$. A sends $\{r,s,h,\text{text}_A\}$ to B.
3. B recovers the value $\alpha^x$ mod p by computing $\alpha^s(p_A)^r$ mod p and then computes the shared session key $K=(r\alpha^x)^{b^{-1}}=\alpha^t$ mod p. B also computes the value h' of function $F(p_A,K)$ and verifies that this value is equal to h.

Again therefore by binding together the public information $\pi$ and the session key K in the hash function, the interposition of E will not result in identical hash functions h,h'.

In each case it can be seen that a relatively simple modification to the protocols involving the binding of public and private information in a cryptographic function foils the interposition of interloper E.

All the protocols discussed above have been described in the setting of the multiplicative group $\alpha \epsilon^T Z^*_p$. However, they can all be easily modified to work in any finite group in which the discrete logarithm problem appears intractable. Suitable choices include the multiplicative group of a finite field (in particular the finite field $GF(2^n)$), subgroups of as $\alpha \epsilon Z^*_p$ of order q, and the group of points on an elliptic curve defined over a finite field. In each case an appropriate generator $\alpha$ will be used to define the public keys.

The protocols discussed above can also be modified in a straightforward way to handle the situation when each user picks their own system parameters p and $\alpha$ (or analogous parameters if a group other than $Z^*_p$ is used).

Further implementations are shown schematically in FIGS. 2 through 7. A different notation is utilized but it will be understood that this notation may be mapped to that of the previous embodiments.

Figure 2:
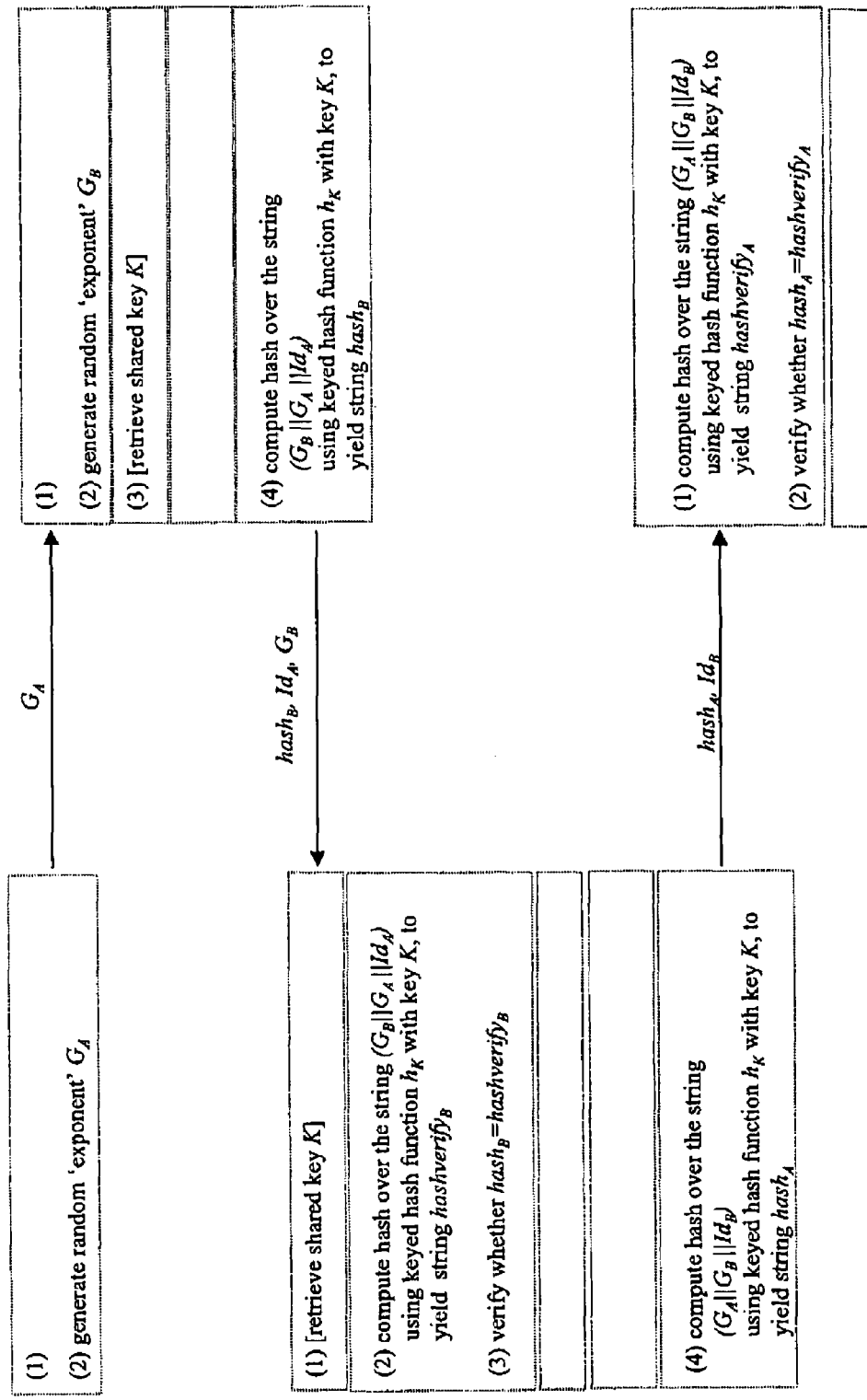

Referring to FIG. 2, a mutual public key authenticated key agreement protocol is complemented between a correspondent A shown on the left hand side of the figure and a correspondent B shown on the right hand side. Correspondent A has a public-private key pair $P_A,S_A$ respectively and similarly correspondent B has a public private Key pair $P_B,S_B$.

As a first step, correspondent A generates a session private key as a random number $RND_A$ and computes a corresponding public session key $G_A=F_A(RND_A)$. The function $F_A$ is a cryptographic one way function, typically an exponention by the group generator, such as a point multiplication in an elliptic curve cryptosystem.

The public session key $G_A$ is forwarded to correspondent B who generates corresponding parameters of a session private key $RND_B$ and the exponent $G_B$.

The correspondent B computes a session key K as a function of A's public information $G_A,P_A$ AND B's private information $RND_B,S_B$. A corresponding key K' can be computed by A using the private information of A and the public information of B namely $f(RND_A,G_B,S_A,P_B)$.

After correspondent B has generated the key K, he compiles a string $(G_A//G_B//Id_A)$ where $Id_A$ is a string that identifies A. The concatenated string is hashed with a cryptographic function $h_k$ which is a keyed hash function that uses the key K to yield a string $hash_B$.

The string $hash_B$ is forwarded to correspondent A together with $Id_A$ and $G_B$.

Upon receipt of the message from B, correspondent A computes the key K' as described above. Correspondent A also computes a hash, $hashverify_B$ from the string $(G_B//G_A//$ Id$_A$) using the hash function keyed by the key K'. correspondent A checks that the hashes verify to confirm the identity of the keys K,K'.

Correspondent A then computes a hash h$_K$ using the key K on the string (G$_A$//G$_B$//Id$_B$) and forwards that together with Id$_B$ correspondent B. Correspondent B similarly computes a hashverify$_A$ using the keyed hash function h$_K$ on the same string and verifies that hash$_A$=hashverify$_A$.

Figure 3:
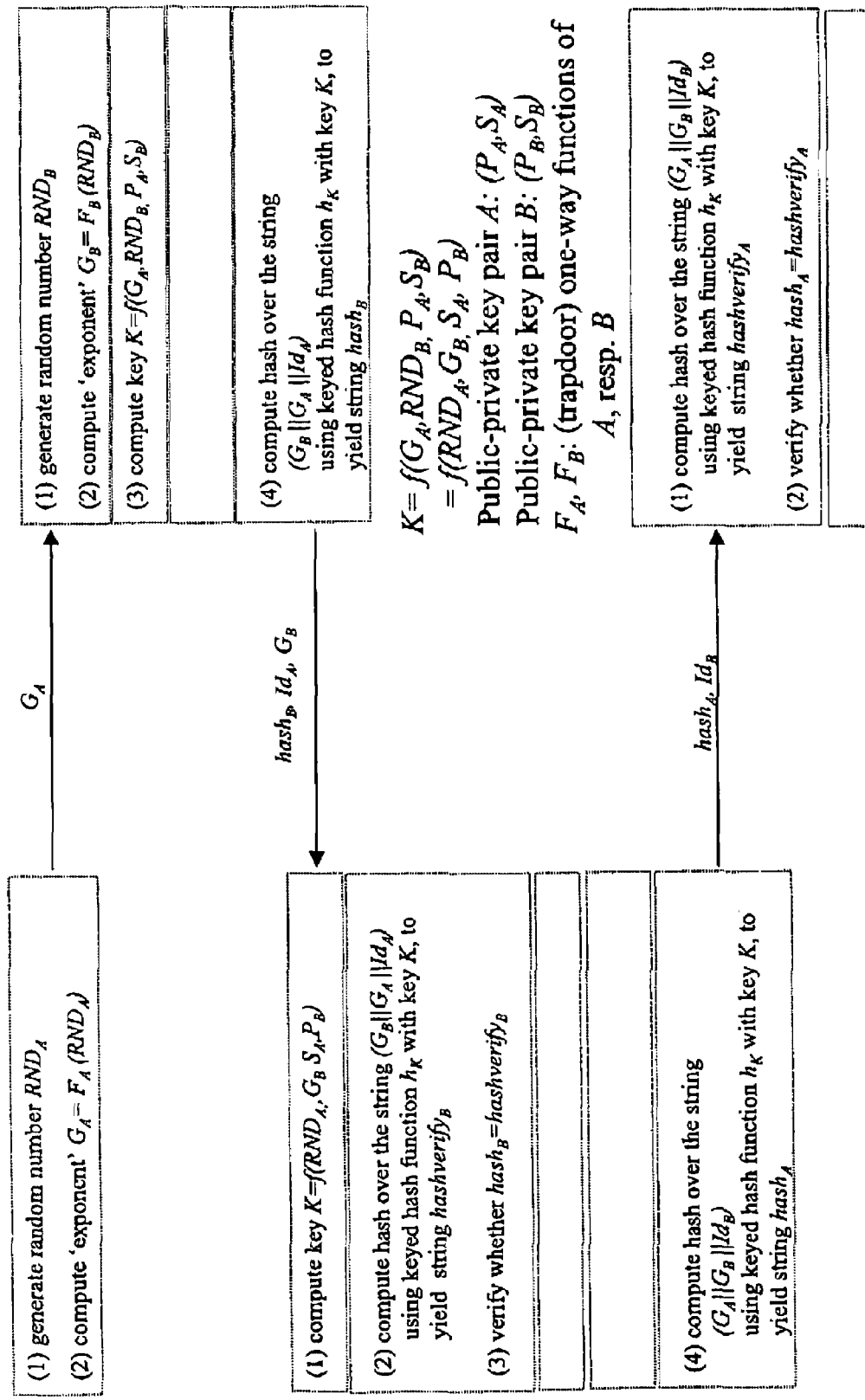

A similar protocol is shown in FIG. 3 to implement a mutual symmetric key authentication protocol. In this protocol the correspondents share a key K obtained s over a secure channel. The correspondents A,B, each generate a random integer which is used as the session public key of A and B respectively. Thereafter the exchange of information and verification proceeds as above with respect to FIG. 2 with the shared secret key being utilised in the keyed hash functions.

Figure 4:
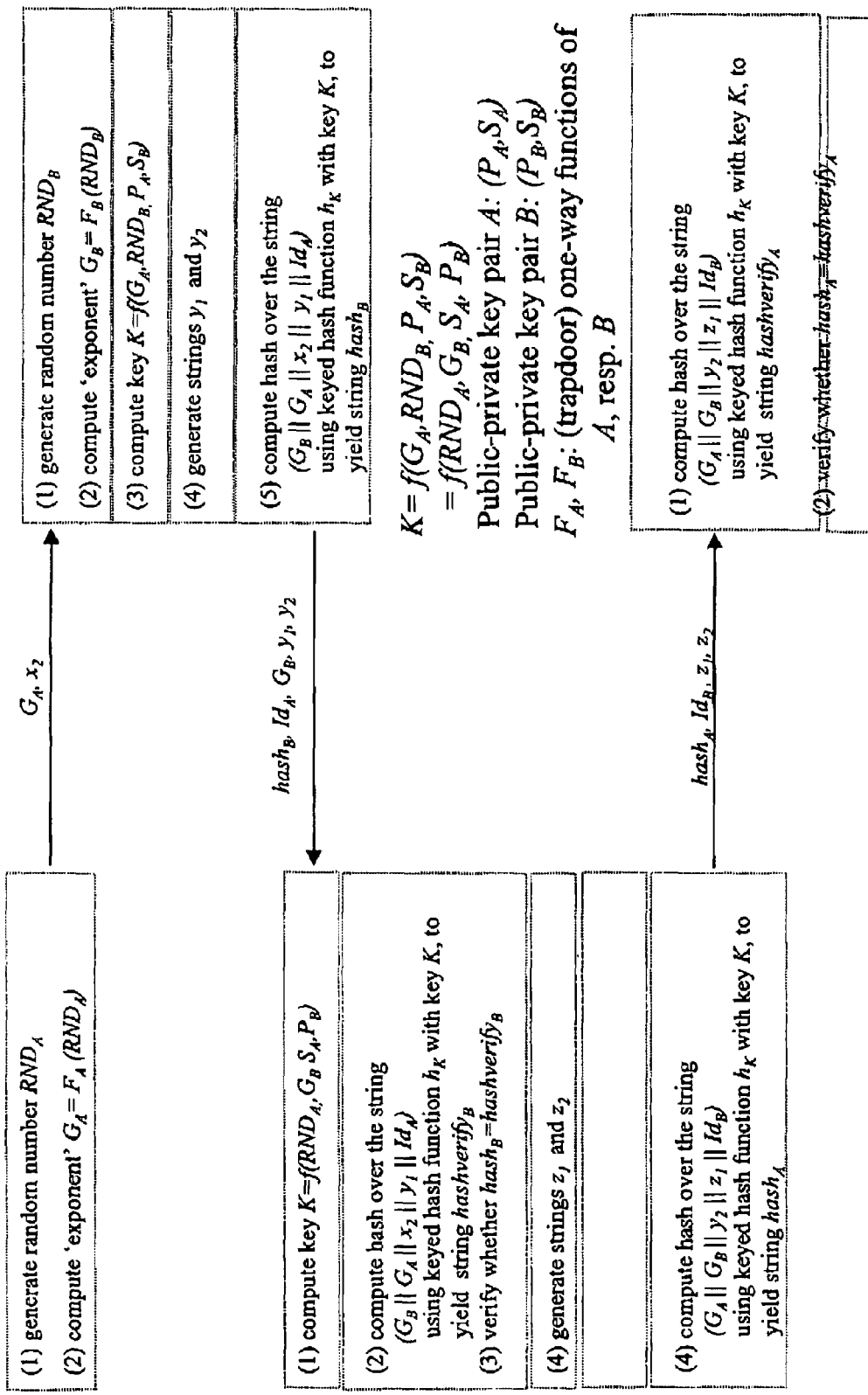

A full mutual public key authenticated protocol is shown in FIG. 4. An initial exchange of the public keys P$_A$,P$_B$ is performed over an authenticated channel followed by the exchange of information as shown in the protocol of FIG. 4. In this case the correspondent A sends G$_A$ computed as described above with respect to FIG. 2, together with a string x$_2$ that A wants confirmation of receipt by B. Correspondent B computes the key K as in FIG. 2 and also generates a pair of strings y$_1$,y$_2$ which B wants to have authenticated by A and receipt confirmed by A respectively. The strings are sent to A with the hash hash$_B$ and identity Id$_A$. The hash hash$_B$ is performed on a string including the message x$_2$ and the string y$_1$ wants authenticated.

Correspondent A computes the key K and verifies the hash as before. This also confirms receipt of x$_2$ by B.

Correspondent A in turn generates strings z$_1$,z$_2$ where z$_1$ is a string that A wants authenticated by B and z$_2$ is a string that may be used in a subsequent stage of the protocol described below. The strings, z$_1$ and y$_2$ together with the identifying information of B, Id$_B$, are included in the string that is hashed with the key K to provide the string hash$_A$. this is sent together with the identitiy of B and the strings z$_1$,z$_2$ to the correspondent B who can verify the hashes as before, thereby confirming receipt of y$_2$ and authenticating z$_1$.

Thus the exchange of information is exchanged in an authenticated manner and a common key obtained that allows subsequent exchange of correspondence on a secure channel.

With the protocol described in FIG. 4 it is possible to implement a mutual public key authenticated key agreement protocol by letting the strings x$_2$,y$_1$,y$_2$,z$_1$,z$_2$ all be empty a strings. Alternatively, a mutual public key authenticated key agreement protocol with key transport can be implemented by using x$_2$ as a string that is assumed to represent E$_K$(k). Correspondent B can compute the value of K and hence retrieve the notional value of k from the string. He can use this as his CRP. The values of y$_1$ may be used to represent E$_K$(k$_{21}$) and z$_1$ as E$_K$(k$_{12}$) where k$_{21}$ and k$_{12}$ are different keys for communication or other secret information to be shared between the correspondents. In this case y$_1$ and z$_2$ are empty strings. In this way there is a key agreement on a shared key K$_{AB}$ together with authenticated key transport of the keys k$_{21}$ and k$_{12}$ between the correspondents. Moreover, if additional information is provided in the x$_2$ and y$_2$ then confirmation of proper receipt is also obtained.

Figure 5:
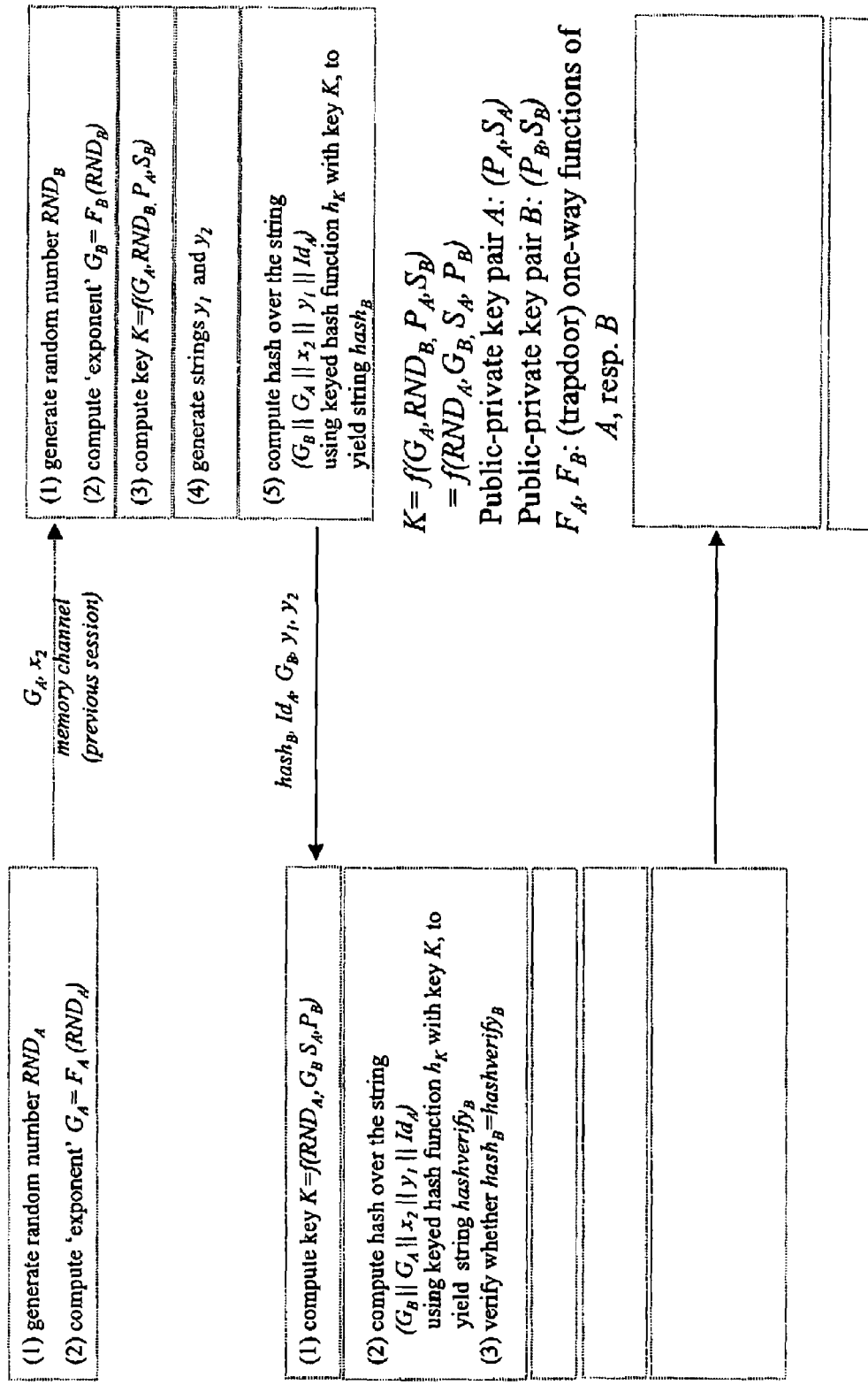

The protocol of FIG. 4 may also be used to increase efficiency in successive sessions by using the string z$_2$ to pass the information exchanged in the first pass of the next session. Thus as shown in FIG. 5, the string G$_A$,x$_2$ is sent as z$_2$ in the previous session. The protocol then proceeds from correspondent B as before. Correspondent B may also take advantage of this facility by including the information G$_B$,y$_1$ for the next session in the exchange as y$_2$.

Figure 6:
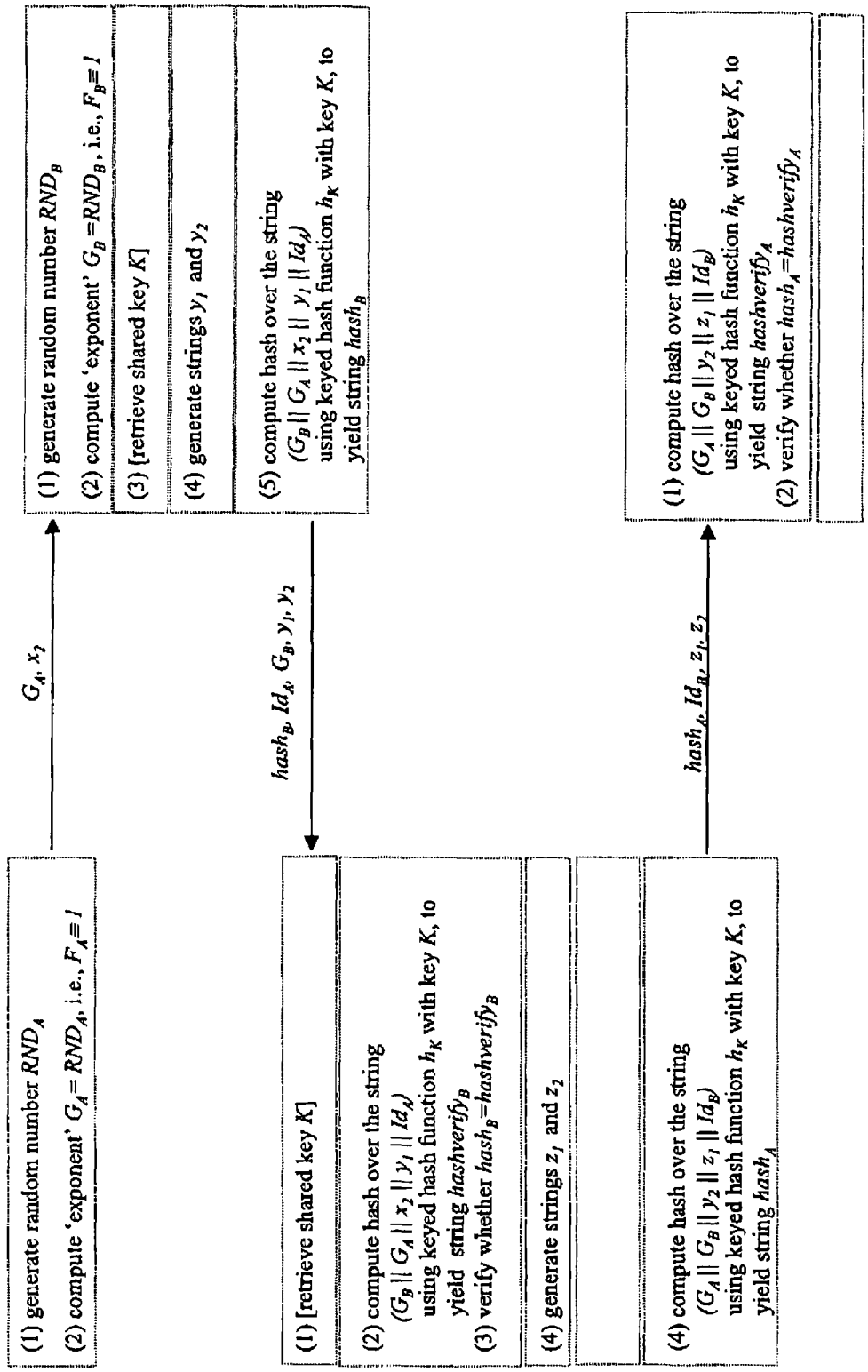

The mutual public key authenticated key agreement protocol may also be adapted for symmetric key implementations as shown in FIG. 6. In this case, as in FIG. 3 above, the key generation is omitted as the correspondents have a shared key obtained over a secure channel.

Similarly, the protocol of FIG. 6 may be modified as illustrated in FIG. 7 to take advantage of the exchange of information in a previous session, similar to that of FIG. 5.

It will be seen therefore that a number of versatile and flexible protocols can be developed from the general protocol to meet particular needs. These protocols may implement elliptic curve cryptography or operate in Z$_p$ as preferred.

We claim:

1. A method of authenticating a pair of correspondents A,B in a data communication system to permit exchange of information therebetween over a communication link, each of said correspondents having a respective private key a,b and a public key p$_A$, p$_B$ derived from a generator a and respective ones of said private keys a,b, said method including the steps of i) a first of said correspondents A selecting a first random integer x and exponentiating a function f($\alpha$) including said generator to a power g(x) to provide a first exponentiated function f($\alpha$)$^{g(x)}$;

ii) said first correspondent A forwarding to a second correspondent B a message including said first exponentiated function f($\alpha$)$^{g(x)}$;

iii) said correspondent B selecting a second random integer y and exponentiating a function f($\alpha$) including said generator to a power g(y) to provide a second exponentiated function f($\alpha$)$^{g(y)}$;

iv) said second correspondent B constructing a session key K from information made public by said first correspondent A and information that is private to said second correspondent B, said session key K also being constructible by said first correspondent A from information made public by B and information that is private to said first correspondent A;

v) said second correspondent B generating a value h of a function F[$\delta$,K] where F[$\delta$,K] denotes a cryptographic function applied conjointly to $\delta$ and K and where $\delta$ is a subset of the public information provided by B thereby to bind the values of $\delta$ and K;

vi) said second correspondent B forwarding a message to said first correspondent A including said second exponential function f($\alpha$)$^{g(y)}$ and said value h of said cryptographic function F[$\delta$,K];

vii) said first correspondent receiving said message and computing a session key K' from information made public by said second correspondent B and private to said first correspondent A;

viii) said first correspondent A computing a value h' of a cryptographic function F[$\delta$,K'];

ix) comparing said values obtained from said cryptographic functions F to confirm their correspondence; and x) upon such confirmation, permitting further exchange of information over said communication link.

2. A method of claim 1 wherein said message forwarded by said first correspondent includes an identification of the first correspondent.

3. A method according to claim 1 wherein said message forwarded by said second correspondent includes an identification of said second correspondent.

4. A method according to claim 3 wherein said message forwarded by said first correspondent includes an identification of the first correspondent.

5. A method according to claim 1 wherein said first function f(α) including said generator is said generator itself.

6. A method according to claim 1 wherein said second function f(α) including said generator is said generator itself.

7. A method according to claim 6 wherein said first function f(α) including said generator is said generator itself.

8. A method according to claim 1 wherein said first function including said Generator f(α) includes said public key $p_B$ of said second correspondent.

9. A method according to claim 1 wherein said second function including said generator f(α) includes said public key $p_A$ of said first correspondent.

10. A method according to claim 1 wherein said cryptographic functions F are hashes of δ and K.

11. A method of transporting a key between a pair of correspondents A,B in a data communication system to permit exchange of information therebetween over a communication link, each of said correspondents having a respective private key a,b and a public $p_A$, $p_B$ derived from a generator α and respective ones of said private keys a,b, said method including the steps of
  i) a first of said correspondents A selecting a first random integer x and exponentiating a function f(α) including said generator to a power g(x) to provide a first exponentiated function $f(\alpha)^{g(x)}$;
  ii) said first correspondent A forwarding to a second correspondent B a message including said first exponentiated function $f(\alpha)^{g(x)}$;
  iii) said second correspondent B constructing a session key K from information made public by said first correspondent A and information that is private to said second correspondent B, said session key K also being constructible by said first correspondent A from information made public by B and information that is private to said first correspondent A;
  iv) both of said first correspondent A and said second correspondent B computing a respective value h,h' of function F[δ,K] where F[δ,K] denotes a cryptographic function applied to δ and K and where δ is a subset of the public information provided by one of said correspondents;
  v) at least one of said correspondents comparing said values h,h' obtained from said cryptographic function F to confirm their correspondence; and
  vi) upon such confirmation, permitting further exchange of information over said communication link.

12. A method of claim 11 wherein said message forwarded by said first correspondent includes an identification of the first correspondent.

13. A method according to claim 11 wherein said message forwarded by said first correspondent includes said value obtained from said cryptographic function by said first correspondent.

14. A method according to claim 11 wherein said values obtained from said cryptographic functions are obtained from a hash of said public information and said session key K.

15. A method according to claim 11 wherein said first correspondent selects a pair of random integers x and t and generates a session key K as $f(\alpha)^{g(t)}$, and generates a value r from said first exponentiated function $f(\alpha)^{g(x)}$ which includes a factor exponentiating said public key $p_B$ of said second correspondent B with said random integer t to be of the form $p_B^{E(t)} \alpha^{g(x)}$.

16. A method according to claim 15 wherein said first correspondent A generates a value s from a combination of said random integer x and said private key a and forwards said value of r and said value of s to said second correspondent B to permit said second correspondent B to recover said session key K using the private key b of said second correspondent B.

17. A method according to claim 16 wherein said random integer x and said private key a are combined to produce s such that s=x−ra mod (p−1).

18. A method according to claim 17 wherein said cryptographic function F is a hash of said public information δ and said session key K.

19. A method according to claim 18 wherein said public information δ is the public key $p_A$ of said first correspondent A.

* * * * *